US006721677B2

(12) United States Patent
Pierce et al.

(10) Patent No.: US 6,721,677 B2
(45) Date of Patent: Apr. 13, 2004

(54) SYSTEM AND METHOD FOR MODULAR STORAGE OF MEASUREMENT STREAMS USING A HIERARCHY OF STREAM-PROCESSING OBJECTS

(75) Inventors: David Mark Pierce, Austin, TX (US); Dudley Wayne Fox, Jr., Austin, TX (US)

(73) Assignee: National Instruments Corporation, Austin, TX (US)

( * ) Notice: Subject to any disclaimer, the term of this patent is extended or adjusted under 35 U.S.C. 154(b) by 29 days.

(21) Appl. No.: 09/920,614

(22) Filed: Aug. 2, 2001

(65) Prior Publication Data

US 2003/0028344 A1 Feb. 6, 2003

(51) Int. Cl.[7] .................................................. G01D 1/00
(52) U.S. Cl. ....................................................... 702/127
(58) Field of Search ........................ 702/127, 12, 186; 607/5; 707/10; 364/422, 497; 250/269

(56) References Cited

U.S. PATENT DOCUMENTS

| 5,400,246 A | | 3/1995 | Wilson et al. | |
| 5,799,306 A | * | 8/1998 | Sun et al. | 707/10 |
| 5,918,229 A | | 6/1999 | Davis et al. | |
| 5,983,164 A | * | 11/1999 | Ocondi | 702/12 |
| 6,427,083 B1 | * | 7/2002 | Owen et al. | 607/5 |
| 2001/0016489 A1 | * | 8/2001 | Haymes et al. | 455/423 |

* cited by examiner

Primary Examiner—John Barlow
Assistant Examiner—Tung Lau
(74) Attorney, Agent, or Firm—Meyertons Hood Kivlin Kowert & Goetzel, P.C.; Jeffrey C. Hood

(57) ABSTRACT

A method and system for modular storage of measurement streams using a hierarchy of stream-processing objects. A first application may log measurement data of a plurality of data types to a shared memory location on a first computer, independent of the data type. Both the data and an index to the data may be logged. A second application may trend the data substantially concurrently as the data is logged. Both applications may include a plurality of filter objects, including a hierarchy of stream processing objects, which may operate to log/trend the data. Trending may include: (1) generating a query; (2) determining the location using the index; (3) accessing the data from the shared memory; and (4) displaying the data. The data may be replicated to an archival database, independent of the type of data. The replicated data may be transmitted to a plurality of computers.

17 Claims, 6 Drawing Sheets

ND METHOD FOR MODULAR
STORAGE OF MEASUREMENT STREAMS
USING A HIERARCHY OF STREAM-
PROCESSING OBJECTS

BACKGROUND OF THE INVENTION

1. Field of the Invention

The present invention relates to computer software, and more particularly to storage and retrieval of multiple types of measurement streams.

2. Description of the Related Art

Various measurement devices may provide different measurement streams (e.g., value-time pairs, data acquisition (DAQ) data). Typically, separate software application programs are required to process different types of measurement data (e.g., different measurement streams). Conventional database configuration typically implies that certain characteristics (e.g., persistence (storage on disk), caching, replication, networking, security) are dependent upon the type of data stored in the database. It is desirable to have robust software application programs that are able to process multiple types of measurement data using a shared code base. Benefits of a shared code base may include a smaller footprint (i.e., code size) and ease of maintenance.

For the foregoing reasons, there is a need for a system and method for modular storage of multiple types of measurement streams (i.e., input data).

SUMMARY OF THE INVENTION

The present invention provides various embodiments of a system, method, and medium for modular storage of measurement streams using a hierarchy of stream-processing objects.

A first application may log or write first measurement data to a shared memory location on a first computer system. The first measurement data may include one or more types of measurement data (e.g., live data acquired from a data acquisition device; waveform data; single-point data, wherein single-point data comprises a data value and a data timestamp; alarm data; event data, among others). The first application program may receive measurement data of a plurality of data types from a plurality of measurement devices prior to logging or writing or storing the first measurement data. The storing of the first measurement data may be independent of the data type of the measurement data.

The first application may include a plurality of first filter objects which operate to log the first measurement data. The plurality of first filter objects may include a hierarchy of first stream processing objects.

Logging may include receiving the first measurement data from a first measurement device, and storing the first measurement data in the shared memory location. Typically, the shared memory location is stored in a volatile memory. Storing the first measurement data may include storing the first measurement data in the shared memory location and storing an index to the first measurement data, wherein the index is also stored in the shared memory location.

A second application may trend, read, or retrieve the first measurement data, or at least a subset of the first measurement data, from the shared memory location on the first computer system substantially concurrently as the first measurement data is logged to the shared memory location on the first computer system by the first application.

Similar to the first application, the second application may include a plurality of second filter objects which operate to trend the first measurement data. The plurality of second filter objects may include a hierarchy of second stream processing objects. The plurality of first filter objects and the plurality of second filter objects may share filter objects.

Trending may include: (1) generating a query for the first measurement data stored in the shared memory location; (2) determining the location of the first measurement data in the shared memory using the index of the first measurement data; (3) accessing the first measurement data from the shared memory; and (4) displaying the first measurement data on a display.

The first measurement data stored in the shared memory location of the first computer system may be replicated to an archival database. The replication of the first measurement data may be independent of the type of measurement data. Thus, the replication may not require a version of the application software able to read and/or write any type of measurement data (i.e., the first application or the second application). When updated software to support a new data type for at least one of the first application and the second application is installed on the first computer system, the replication of the first measurement data may support the new data type without modification.

The archival database may be stored on the first computer system. Alternatively, the archival database may be stored on a second computer system, the second computer system being coupled to the first computer system via a network.

The second computer system may transmit the replicated data to a plurality of computer systems. Similarly, in the case where the archival database is stored on the first computer system, the first computer system may transmit the replicated data to a plurality of computer systems.

BRIEF DESCRIPTION OF THE DRAWINGS

A better understanding of the present invention can be obtained when the following detailed description of several embodiments is considered in conjunction with the following drawings, in which.

Figure 1:
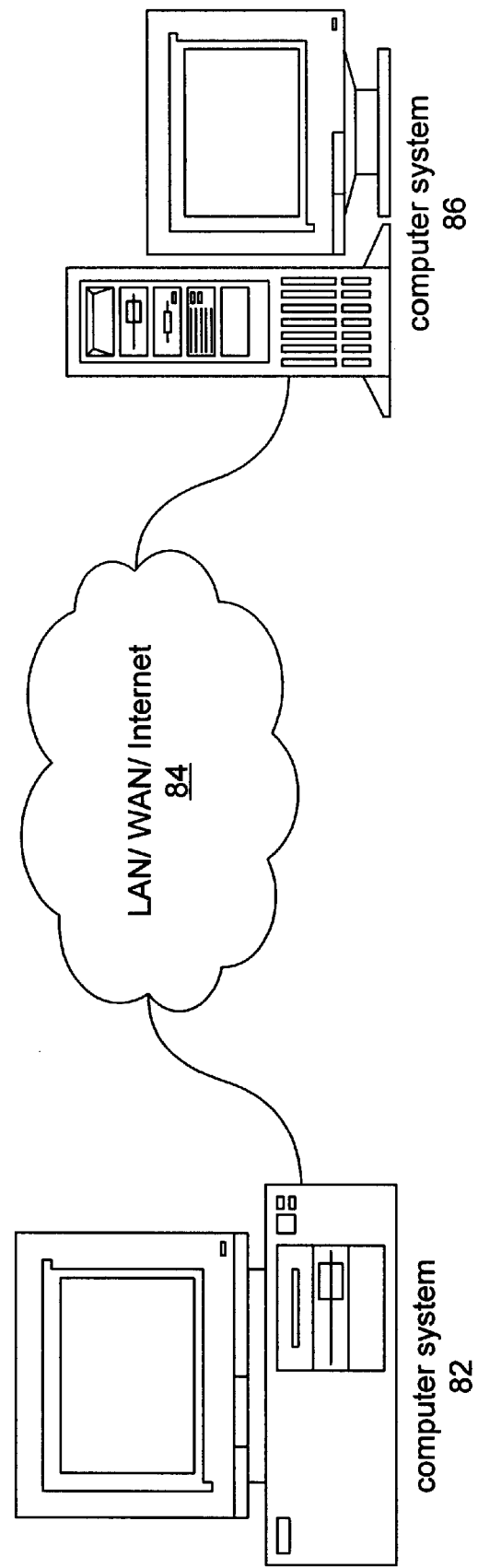
FIG. 1 illustrates a computer system connected through a network to a second computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

FIG. 1: Computer System Connected to a Network

FIG. 1 illustrates an exemplary computer network in which a computer system 82 is connected through a network 84 to a second computer system 86. The computer system 82 and the second computer system 86 can be any of various types, as desired. The network 84 can also be any of various types, including a LAN (local area network), a WAN (wide area network), or the Internet, among others.

The computer system 82 includes or stores a first client computer program operable to store multiple types of measurement streams and a second client computer program operable to retrieve multiple types of measurement streams. In one embodiment, the data in the measurement streams may be of various types, as described below. The data may reside in a database on the computer system 82 or on the second computer system 86.

The first client computer program and the second client computer program may be implemented in any of various ways, including procedure-based techniques, component-based techniques, and/or object-oriented techniques, among others. The programs may be written using any combination of text-based or graphical programming languages. Also, the programs may be written using distributed modules or components so that so that the first client computer program, the second client computer program, and the database may reside on any combination of computer system 82, computer system 86, and other computer systems connected to the network 84.

Figure 2A:
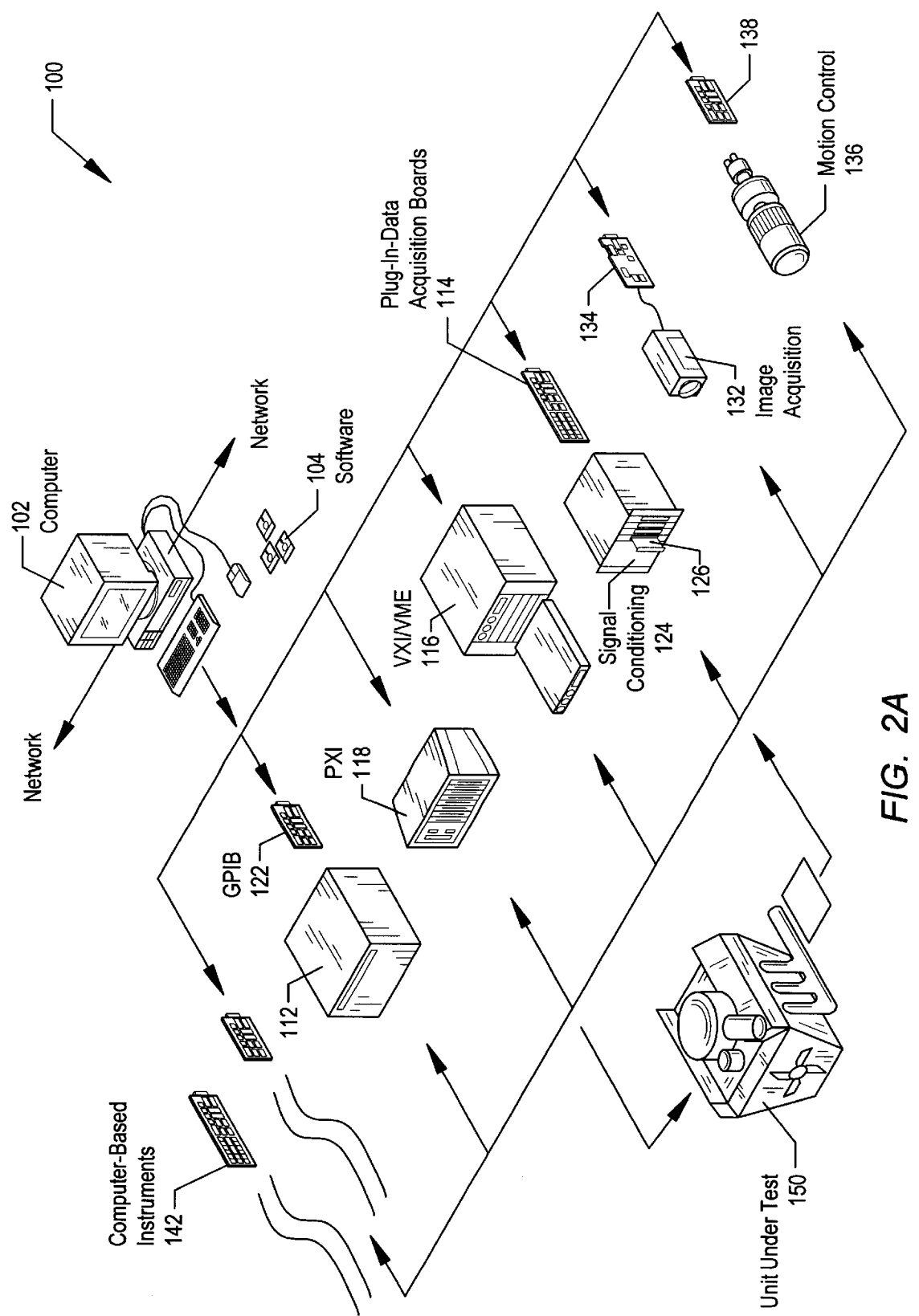
FIGS. 2A and 2B illustrate representative instrumentation and industrial automation systems including various I/O interface options.
Figure 2B:
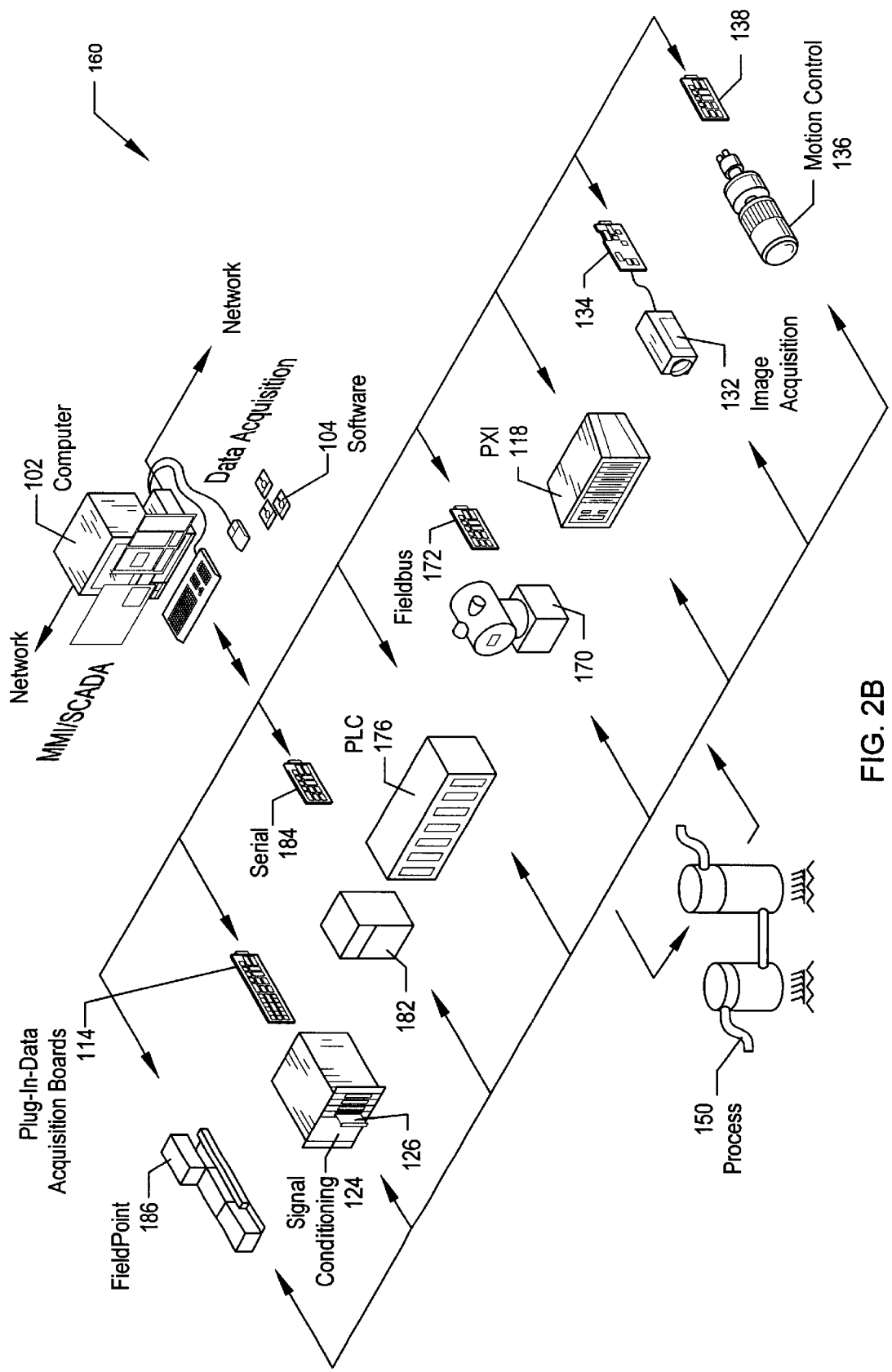

FIGS. 2A and 2B: Instrumentation and Industrial Automation Systems

FIGS. 2A and 2B illustrate exemplary systems which may store or use the first client computer program and the second client computer program. These programs may of course be stored in or used by other types of systems as desired.

FIG. 2A illustrates an instrumentation control system 100. The system 100 comprises a host computer 102 which connects to one or more instruments. The host computer 102 comprises a CPU, a display screen, memory, and one or more input devices such as a mouse or keyboard as shown. The computer 102 may connect through the one or more instruments to analyze, measure, or control a unit under test (UUT) or process 150. The host computer 102 may store the first client computer program and the second client computer program. The data stored by the first client computer program and retrieved by the second client computer program may be acquired from the one or more instruments. In other words, the computer 102 may be either of computers 82 or 86.

The one or more instruments may include a GPIB instrument 112 and associated GPIB interface card 122, a data acquisition (DAQ) board 114 and associated signal conditioning circuitry 124, a VXI/VME chassis or instrument 116, a PXI chassis or instrument 118, a video device 132 and associated image acquisition card 134, a motion control device 136 and associated motion control interface card 138, and/or one or more computer based instrument cards 142, among other types of devices.

The GPIB instrument 112 is coupled to the computer 102 via the GPIB interface card 122 provided by the computer 102. In a similar manner, the video device 132 is coupled to the computer 102 via the image acquisition card 134, and the motion control device 136 is coupled to the computer 102 through the motion control interface card 138. The data acquisition board 114 is coupled to the computer 102, and may interface through signal conditioning circuitry 124 to the UUT. The signal conditioning circuitry 124 preferably comprises a SCXI (Signal Conditioning eXtensions for Instrumentation) chassis comprising one or more SCXI modules 126.

The GPIB interface card 122, the image acquisition card 134, the motion control interface card 138, and the DAQ card 114 are typically plugged in to an I/O slot in the computer 102, such as a PCI bus slot, a PC Card slot, or an ISA, EISA or MicroChannel bus slot provided by the computer 102. However, these cards 122, 134, 138 and 114 are shown external to computer 102 for illustrative purposes.

The VXI/VME chassis or instrument 116 is coupled to the computer 102 via a VXI bus, MXI bus, or other serial or parallel bus provided by the computer 102. The computer 102 preferably includes VXI interface logic, such as a VXI, MXI or GPIB interface card (not shown), which interfaces to the VXI chassis 116. The PXI chassis or instrument 118 is preferably coupled to the computer 102 through the computer's PCI bus.

A serial instrument (not shown) may also be coupled to the computer 102 through a serial port, such as an RS-232 port, USB (Universal Serial bus) or IEEE 1394 or 1394.2 bus, provided by the computer 102. In typical instrumentation control systems an instrument will not be present of each interface type, and in fact many systems may only have one or more instruments of a single interface type, such as only GPIB instruments.

The instruments are coupled to the unit under test (UUT) or process 150, or are coupled to receive field signals, typically generated by transducers. The system 100 may be used in a data acquisition and control application, in a test and measurement application, a process control application, or a man-machine interface application.

FIG. 2B illustrates an exemplary industrial automation system 160. The industrial automation system 160 is similar to the instrumentation or test and measurement system 100 shown in FIG. 2A. Elements which are similar or identical to elements in FIG. 2A have the same reference numerals for convenience. The system 160 may comprise a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as MMI (Man Machine Interface), SCADA (Supervisory Control and Data Acquisition), portable or distributed data acquisition, process control, advanced analysis, or other control. In FIG. 2B, the computer 102 may store the first client computer program and the second client computer program. The data stored by the first client computer program and retrieved by the second client computer program may be acquired from the automation system 160. In other words, the computer 102 may be either of computers 82 or 86.

The one or more devices may include a data acquisition (DAQ) board 114 and associated signal conditioning circuitry 124, a PXI chassis or instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system 186 available from National Instruments, among other types of devices.

The DAQ card 114, the PXI chassis 118, and the image acquisition card 134 are preferably connected to the computer 102 as described above. The serial instrument 182 is coupled to the computer 102 through a serial interface card 184, or through a serial port, such as an RS-232 port, provided by the computer 102. The PLC 176 couples to the computer 102 through a serial port, Ethernet port, or a proprietary interface. The fieldbus interface card 172 is preferably comprised in the computer 102 and interfaces through a fieldbus network to one or more fieldbus devices. Each of the DAQ card 114, the serial card 184, the fieldbus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 2A and 2B, the computer system 102 preferably includes a memory medium on which one or more computer programs or software components according to the present invention are stored. The term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having at least one processor which executes instructions from a memory medium.

In one embodiment, the first client computer program and the second client computer program are designed for data acquisition/generation, analysis and/or display. For example, in one embodiment, the first client computer program is the National Instruments LabVIEW graphical programming environment application, which provides specialized support for developers of instrumentation and industrial automation applications. An example of the second client computer program is the Historical Viewer in Measurement & Automation Explorer (MAX), a National Instruments product.

However, it is noted that the present invention can be used for a plethora of applications and is not limited to instrumentation or industrial automation applications. In other words, FIGS. 2A and 2B are exemplary only, and data acquisition and/or data retrieval programs for any of various types of purposes may be used, where the programs are stored in and execute on any of various types of systems.

Figure 3:
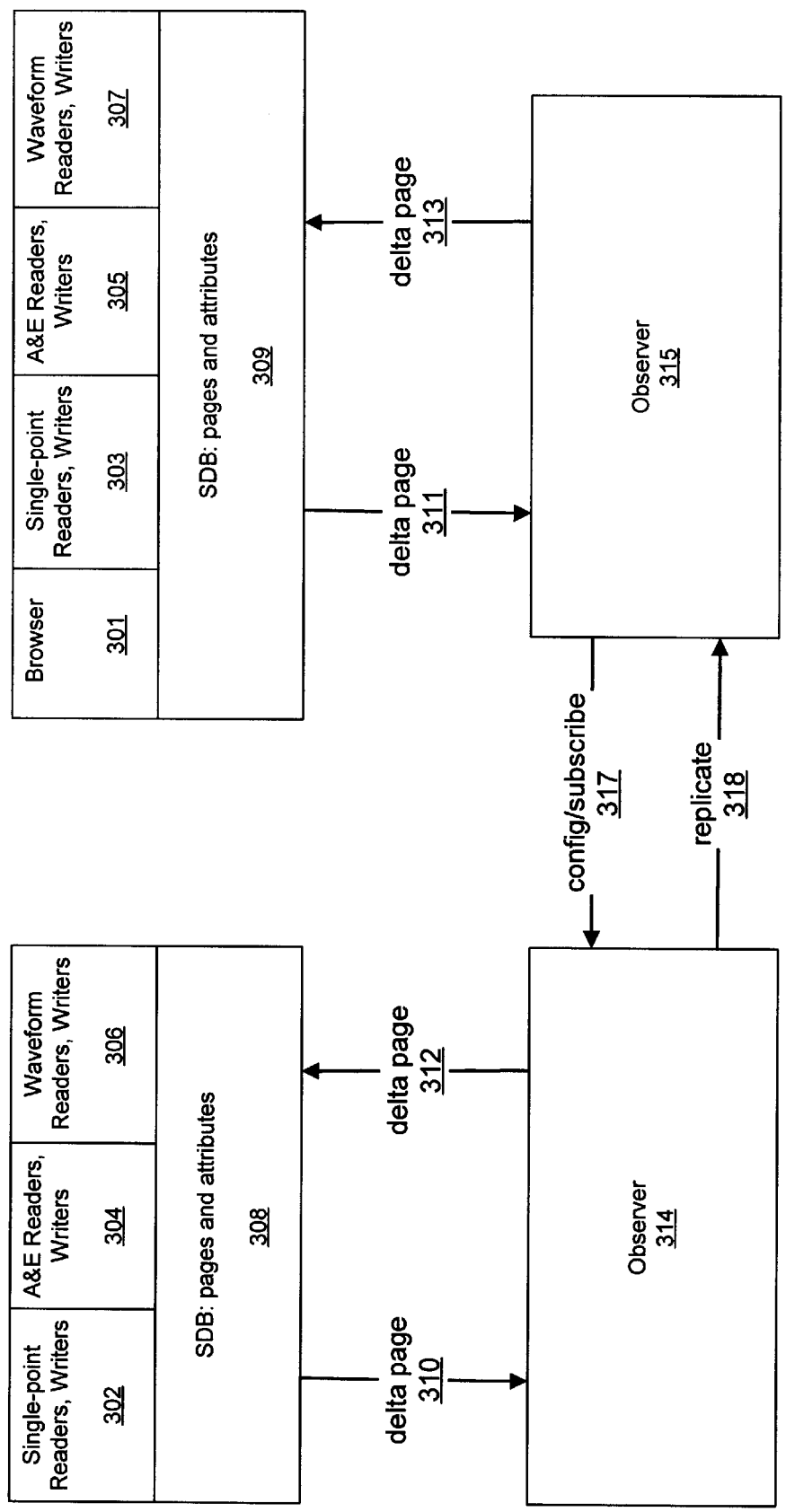
FIG. 3 is a block diagram illustrating an overall architecture of a shared memory architecture for high speed logging and trending, according to one embodiment.

FIG. 3: Overall Architecture

FIG. 3 illustrates one embodiment of a block diagram illustrating an overall architecture of a shared memory architecture for high speed logging and trending.

As used herein, logging refers to writing data and trending refers to reading and displaying data. As used herein, "alarm and event (A & E) data" are types of data that a subsystem, e.g., an alarm subsystem, stores (e.g., events, alarm-set events, alarm-reset events, alarm acknowledgement events).

As used herein, "alarm data" may be a stream of occurrences where each occurrence may be one of three types: set, clear, or acknowledge. Set occurrences may include: a name, a timestamp, a priority, a user (i.e., name of the person logged in when the alarm occurred), an area (i.e., name that may be used to organize alarms into groups), and a description. Clear occurrences may include: a name, a timestamp, and a user (i.e., name of the person who was logged in when the alarm cleared). Acknowledge occurrences may include: a name, a timestamp, a user (i.e., name of the person acknowledging the alarm), and a comment (e.g., a string describing why the alarm occurred and how it was dealt with). As used herein, "event data" may be a stream of event occurrences where each event occurrence may include: a name, a timestamp, a user (i.e., name of the person logged in when the event occurred), and a description.

As used herein, "attribute data" may include a set of attributes or name-value pairs associated with each trace in a streaming database (SDB). As used herein, "process data" is a type of data for which values change slowly. When a value change that is more than a user-specified threshold is detected, the changed value and a timestamp are logged. As used herein, "single-point data" is a type of data that is acquired asynchronously from one or more input channels and logged as a stream of value-timestamp pairs. As used herein, "waveform data" is acquired synchronously and stored using an initial timestamp and which may include a time interval representing the time between successive points.

As used herein, an "observer" is a component that keeps streaming databases (SDBs) on different computers synchronized with each other. As used herein, a "reader" is a software program or object, e.g., a filter object, for reading data of various types. As used herein, a "writer" is a software program or object, e.g., a filter object, for writing data of various types. As used herein, a "streaming database" (SDB) is a component that stores sub-traces or streams of data, or arrays of bytes, into sequences of a certain page size, such as 4 KB pages, in a shared memory or on a disk. The pages of changes may be referred to as delta pages. As used herein, a "delta page" is a structure that represents the difference between the current state of a page in a client's cache and the current state of the page in the server's database.

As shown in FIG. 3, single-point writers 302 and 303 may be used to log value-timestamp pairs. Similarly, single-point readers 302 and 303 may be used to display previously logged data.

Alarm and event (A&E) writers 304 and 305 may be used to log events (e.g., alarm set events, reset events, acknowledge events). A&E readers 304 and 305 may be used to determine when an alarm has been acknowledged. A&E readers 304 and 305 may also be used to read events, to be stored in a database (e.g., a relational database).

Waveform writers 306 and 307 may be used to write high-speed data (e.g., up to millions of samples per second, or at a rate of up to 250 kHz). Waveform readers 306 and 307 may be used to retrieve and display data.

As used herein, a "shared memory template" is a data structure, such as a C++ construct. A "shared memory template" may be functionally similar to the map template in the C++ standard template library. Shared memory templates may store data such that the data may be safely shared among multiple processes. A browser 301 may expose shared memory templates for users to enable browsing of data in both a local SDB 309 and remote SDBs (e.g., SDB 308). A user may build upon the shared memory templates exposed by the browser 301 to allow multiple types of data to be browsed. The shared memory templates may allow the type of data to browse to be user configurable.

A streaming database (SDB) 308 or 309 may be a shared-memory database including sub-traces (e.g., collections of 4 KB pages or delta pages) and associated attributes of the sub-traces. From an SDB's perspective, the previously mentioned writers and readers (e.g., 302 through 307) deal with delta pages.

Observers 314 or 315 may be responsible for remote browsing, replication, configuration and/or subscribing, and networking. An observer, may read a delta page and modified attributes from a source SDB, and may subsequently send the delta page to a client observer. For example, observer 314 may read a delta page 310 and modified attributes from a source SDB 308 and may subsequently send or replicate 318 the delta page to a client observer 315. Similarly, observer 315 may read a delta page 311 and modified attributes from a source SDB 309 and may subsequently configure or subscribe 317 the delta page to a client observer 314. The client observer may write delta pages and modified attributes to a local SDB. Thus, observer 314 may write delta pages 312 to SDB 308 and observer 315 may write delta pages 313 to SDB 309.

Figure 4:
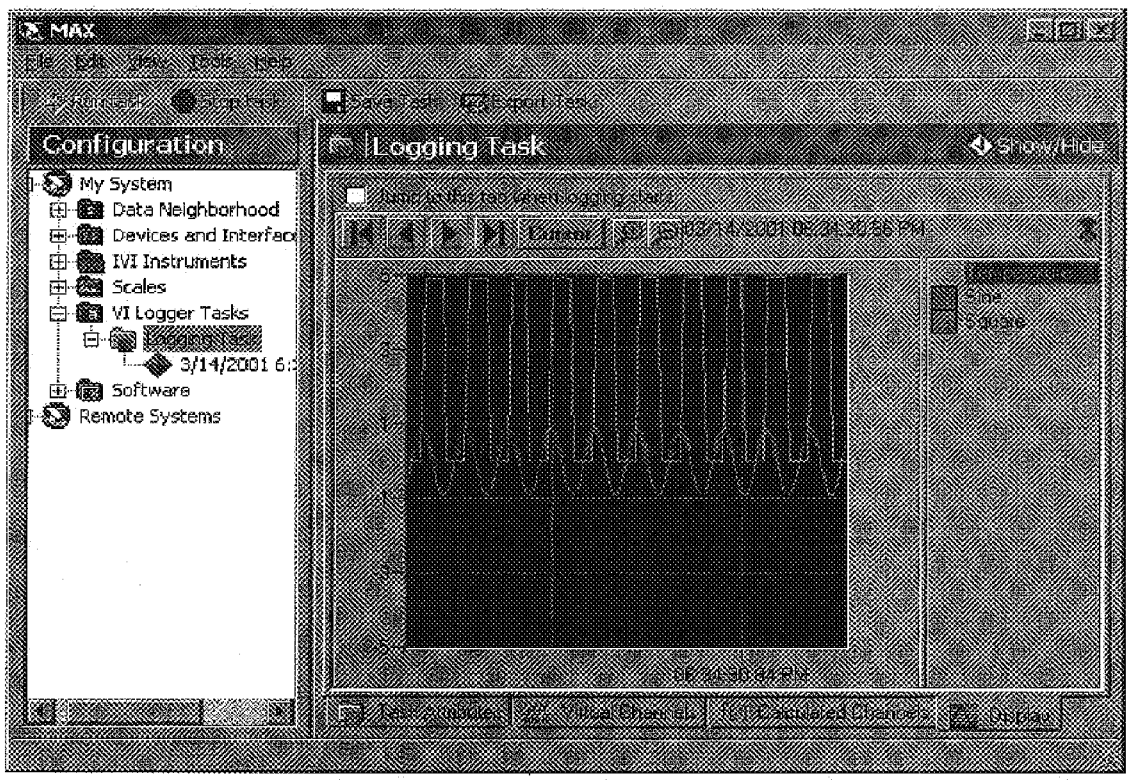
FIG. 4 is a screen shot of high speed trending, according to one embodiment.

FIG. 4: Screen Shot of High Speed Trending

One embodiment of a trender application program (i.e., the Historical Viewer in Measurement & Automation Explorer (MAX), a National Instruments product) is shown in FIG. 4. The MAX program may be configured to repeatedly read data from a stored location (e.g., a shared memory location) and subsequently display the data on a display device. Later data may be continuously logged to the storage location at the same time that earlier data is displayed to the user.

As shown in FIG. 4, a logging task is displayed. Acquisition of data may be user configured to start in response to an analog trigger or a digital trigger. Additional user configurable options may include: (1) start and stop data acquisition at user specified times; (2) publish acquired data to a data socket; (3) define and log virtual channels; (4) define and log calculated channels; (4) define and log events (e.g., high, low, outside range, inside range); (5) display data (e.g., in real time or historical data) in a HyperTrend, among others. In one embodiment, the HyperTrend is a user-interface component developed by National Instruments and available with its LabVIEW DSC, Lookout, and VI Logger products. The HyperTrend may support the viewing of both current and historical data retrieved from a database. The HyperTrend may allow the user to perform multiple tasks, such as browsing for data, displaying data in a chart, and submitting queries for breaks, minima, and maxima in a stream of data that has been logged to a database, among others.

Figure 5:
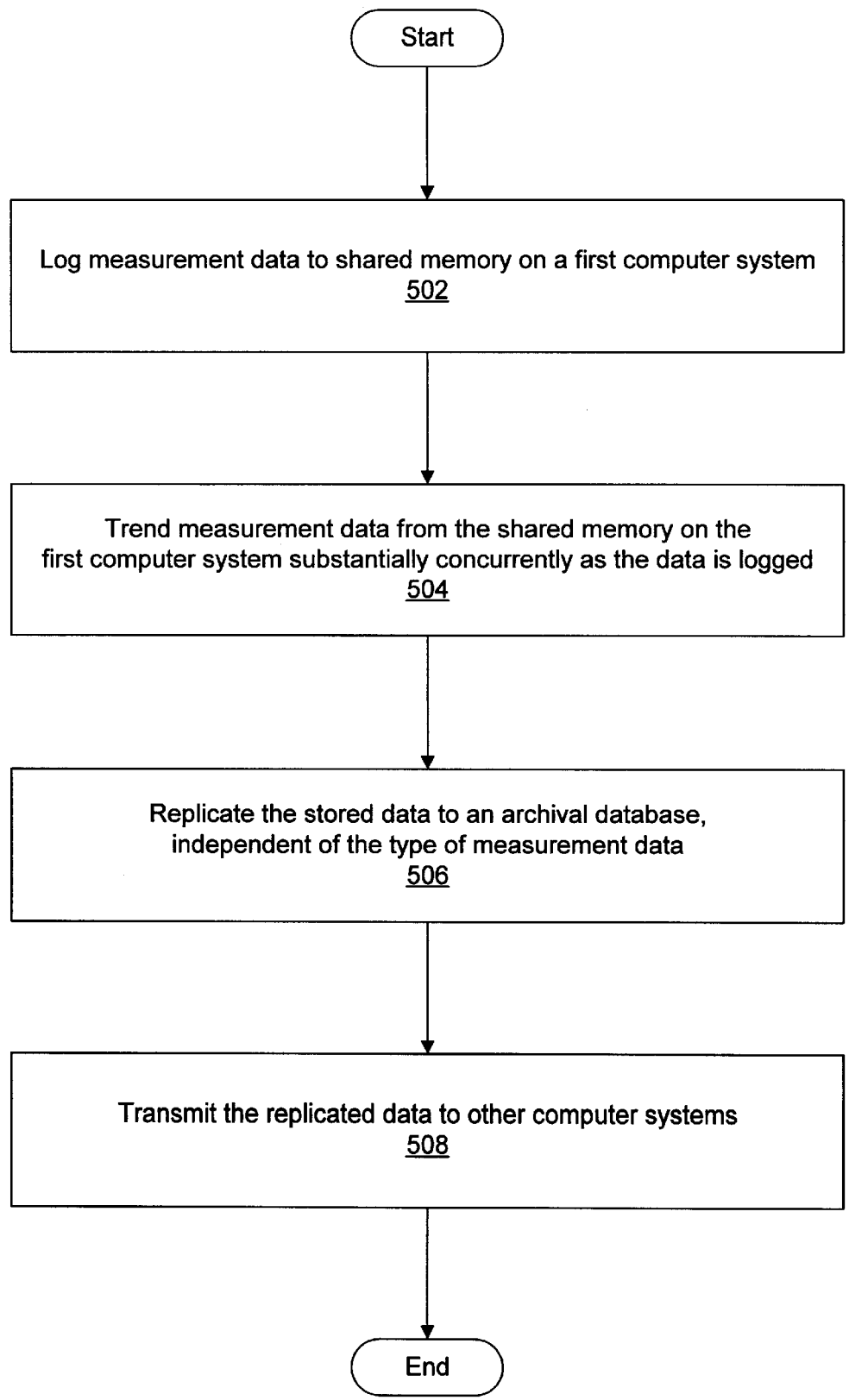
FIG. 5 is a flowchart illustrating a system and method for modular storage of measurement streams using a hierarchy of stream-processing objects, according to one embodiment.

FIG. 5: Modular Storage of Measurement Streams

FIG. 5 is a flowchart illustrating a system and method for modular storage of measurement streams using a hierarchy of stream-processing objects, according to one embodiment.

In step 502, a first application may log or write first measurement data to a shared memory location on a first computer system. The first measurement data may include one or more types of measurement data (e.g., live data acquired from a data acquisition device; waveform data; single-point data, wherein single-point data comprises a data value and a data timestamp; alarm data; event data, among others). The first application program may receive measurement data of a plurality of data types from a plurality of measurement devices prior to logging or writing or storing the first measurement data. The storing of the first measurement data may be independent of the data type of the measurement data.

The first application may include a plurality of first filter objects which operate to log the first measurement data. The plurality of first filter objects may include a hierarchy of first stream processing objects.

Logging may include receiving the first measurement data from a first measurement device, and storing the first measurement data in the shared memory location. Typically, the shared memory location is stored in a volatile memory. Storing the first measurement data may include storing the first measurement data in the shared memory location and storing an index to the first measurement data, wherein the index is also stored in the shared memory location.

In step 504, a second application may trend, read, or retrieve the first measurement data, or at least a subset of the first measurement data, from the shared memory location on the first computer system substantially concurrently as the first measurement data is logged to the shared memory location on the first computer system by the first application.

Similar to the first application, the second application may include a plurality of second filter objects which operate to trend the first measurement data. The plurality of second filter objects may include a hierarchy of second stream processing objects. The plurality of first filter objects and the plurality of second filter objects may share filter objects.

Trending may include: (1) generating a query for the first measurement data stored in the shared memory location; (2) determining the location of the first measurement data in the shared memory using the index of the first measurement data; (3) accessing the first measurement data from the shared memory; and (4) displaying the first measurement data on a display.

In step 506, the first measurement data stored in the shared memory location of the first computer system may be replicated to an archival database. The replication of the first measurement data may be independent of the type of measurement data. Thus, the replication may not require a version of the application software able to read and/or write any type of measurement data (i.e., the first application or the second application). When updated software to support a new data type for at least one of the first application and the second application is installed on the first computer system, the replication of the first measurement data may support the new data type without modification.

The archival database may be stored on the first computer system. Alternatively, the archival database may be stored on a second computer system, the second computer system being coupled to the first computer system via a network.

In step 508, the second computer system may transmit the replicated data to a plurality of computer systems. Similarly, in the case where the archival database is stored on the first computer system, the first computer system may transmit the replicated data to a plurality of computer systems.

Although the system and method of the present invention have been described in connection with several embodiments, the invention is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A method of performing logging and trending of measurement data on a first computer system, the method comprising:

a first application logging first measurement data to a shared memory location on the first computer system;

a second application trending the first measurement data from the shared memory location on the first computer system substantially concurrently as the first measurement data is logged to the shared memory location on the first computer system;

wherein the first measurement data comprises one or more types of measurement data;

replicating the first measurement data stored in the shared memory location of the first computer system to an archival database;

wherein the replication of the first measurement data is independent of the type of measurement data;

wherein the first application and the second application each support one or more data types; the method further comprising:

installing updated software for at least one of the first application and the second application on the first computer system, wherein the updated software supports a new data type;

wherein the replication of the first measurement data supports the new data type without modification.

2. The method of claim 1, wherein the archival database is stored on the first computer system.

3. The method of claim 1, wherein the archival database is stored on a second computer system;

wherein said second computer system is coupled to said first computer system via a network.

4. The method of claim 3, further comprising:

said second computer system transmitting the replicated data to a third computer system.

5. The method of claim 3, further comprising:

said second computer system transmitting the replicated data to a plurality of computer systems.

6. The method of claim 1, wherein said logging comprises:

receiving the first measurement data from a first measurement device;

storing the first measurement data in the shared memory location, wherein the shared memory location is comprised in a volatile memory, wherein said storing comprises storing the first measurement data in the shared memory location and storing an index to the first measurement data, wherein said index is stored in the shared memory location.

7. The method of claim 1, wherein said trending comprises:

generating a query for the first measurement data comprised in the shared memory location;

determining the location of the first measurement data in the shared memory using the index of the first measurement data;

accessing the first measurement data from the shared memory; and displaying the first measurement data on a display.

8. The method of claim 1, wherein the one or more types of measurement data comprises live data acquired from a data acquisition device.

9. The method of claim 1, wherein the one or more types of measurement data comprise one or more of: waveform data; single-point data, wherein single-point data comprises a data value and a data timestamp; alarm data; event data.

10. A method of storing and retrieving measurement data, the method comprising:

a first application program receiving measurement data of a plurality of data types from a plurality of measurement devices;

the first application program storing the measurement data received from the plurality of measurement devices in a shared memory location, wherein said storing is independent of the data type;

a second application program retrieving at least a subset of the stored measurement data from the shared memory location substantially concurrently with the measurement data being stored in the shared memory location by the first application program;

replicating the stored measurement data from the shared memory location to an archival database;

wherein the replication of the stored measurement data is independent of the data type;

wherein the first application and the second application each support one or more data types; the method further comprising:

installing updated software for at least one of the first application and the second application on the first computer system, wherein the updated software supports a new data type;

wherein the replication of the first measurement data supports the new data type without modification.

11. The method of claim 10, wherein the first application comprises a plurality of first filter objects which operate to log the first measurement data;

wherein the plurality of first filter objects comprise a hierarchy of first stream processing objects;

wherein the second application comprises a plurality of second filter objects which operate to trend the first measurement data;

wherein the plurality of second filter objects comprise a hierarchy of second stream processing objects.

12. The method of claim 11, wherein the plurality of first filter objects and the plurality of second filter objects share filter objects.

13. The method of claim 10, wherein the plurality of data types comprises one or more of the following: live data acquired from a data acquisition device, waveform data, single-point data, alarm data, event data.

14. A method of performing logging and trending of measurement data, the method comprising:

a first application logging first measurement data to a shared memory location;

wherein the first measurement data comprises one or more types of measurement data;

wherein the first application comprises a plurality of first filter objects which operate to log the first measurement data;

wherein the plurality of first filter objects comprise a hierarchy of first stream processing objects;

a second application trending the first measurement data from the shared memory location substantially concurrently as the first measurement data is logged to the shared memory location;

wherein the second application comprises a plurality of second filter objects which operate to trend the first measurement data;

wherein the plurality of second filter objects comprise a hierarchy of second stream processing objects;

wherein the plurality of first filter objects and the plurality of second filter objects share filter objects.

15. A method of performing logging and trending of measurement data on a first computer system, the method comprising:

a first application logging first measurement data to a shared memory location on the first computer system;

a second application trending the first measurement data from the shared memory location on the first computer system substantially concurrently as the first measurement data is logged to the shared memory location on the first computer system, wherein the first measurement data comprises one or more types of measurement data;

replicating the first measurement data stored in the shared memory location of the first computer system to an archival database;

wherein the replication of the first measurement data is independent of the type of measurement data;

wherein the first application comprises a plurality of first filter objects which operate to log the first measurement data;

wherein the plurality of first filter objects comprise a hierarchy of first stream processing objects;

wherein the second application comprises a plurality of second filter objects which operate to trend the first measurement data;

wherein the plurality of second filter objects comprise a hierarchy of second stream processing objects; and wherein the plurality of first filter objects and the plurality of second filter objects share filter objects.

16. A method of storing and retrieving measurement data, the method comprising:

a first application program receiving measurement data of a plurality of data types from a plurality of measurement devices;

the first application program storing the measurement data received from the plurality of measurement devices in a shared memory location, wherein said storing is independent of the data type, and wherein said storing the measurement data received from the plurality of measurement devices in a shared memory location further comprises:

storing the measurement data in the shared memory location;

storing an index to the measurement data, wherein said index is stored in the shared memory location;

a second application program retrieving at least a subset of the stored measurement data from the shared memory location substantially concurrently with the measurement data being stored in the shared memory location by the first application program;

replicating the stored measurement data from the shared memory location to an archival database;

wherein the replication of the stored measurement data is independent of the data type.

17. A method of performing logging and trending of measurement data, the method comprising:

a first application logging first measurement data to a shared memory location;

wherein the first measurement data comprises one or more types of measurement data;

wherein the first application comprises a plurality of first filter objects which operate to log the first measurement data;

wherein the plurality of first filter objects comprise a hierarchy of first stream processing objects;

a second application trending the first measurement data from the shared memory location substantially concurrently as the first measurement data is logged to the shared memory location;

wherein the second application comprises a plurality of second filter objects which operate to trend the first measurement data;

wherein the plurality of second filter objects comprise a hierarchy of second stream processing objects;

wherein the first application and the second application each support one or more data types, the method further comprising:

replicating the first measurement data stored in the shared memory location of the first computer system to an archival database, wherein the replication of the first measurement data is independent of the type of measurement data; and installing updated software for at least one of the first application and the second application on the first computer system, wherein the updated software supports a new data type;

wherein the replication of the first measurement data supports the new data type without modification.

* * * * *